Patented June 22, 1937

2,084,826

UNITED STATES PATENT OFFICE 2,084,826

TITANIUM PIGMENT COMPOSITION AND METHOD OF MAKING SAME

Lonnie W. Ryan, Westfield, and Winfred J. Cauwenberg, Elizabeth, N. J., assignors, by mesne assignments, to National Lead Company, New York, N. Y., a corporation of New Jersey No Drawing. Application December 7, 1935, Serial No. 53,422

9 Claims. (Cl. 134—58)

This application is a continuation in part of our co-pending application for patent filed October 28, 1932, Serial No. 640,008.

Our invention relates to a new titanium pigment composition and to a new method for its manufacture by treating ilmenite with lead compounds.

We have discovered that a titanium pigment composition having excellent protective properties especially for metallic surfaces when incorporated in the usual vehicles may be manufactured by heating powdered ilmenite, which is a naturally occurring ferrous titanate, with a lead compound such as lead, basic lead carbonate, lead acetate, or even with metallic lead which upon heating under atmospheric conditions is converted to lead oxides, etc. At temperatures from below 600° C. up to above 1000° C., the lead compound replaces the iron in the ilmenite to form lead titanate ($PbTiO_3$), while at the same time, depending upon whether the heating is carried out under oxidizing conditions, ferric oxide and ferric titanate may be formed, in which pigment composition substantially all the iron present is combined as ferric iron.

We are aware that it has been known to use powdered ilmenite as a pigment in paint, particularly for the protection of metals, ships' bottoms, etc. We are also aware that it is known to treat ilmenite with sulphuric acid and to calcine the treated material, thus producing a colored pigment. Such procedure has been described and claimed in U. S. Farup Patent No. 1,087,575 dated February 17, 1914.

The preparation of lead titanate by heating $TiO_2$, either synthetically produced or as occurring in nature, for example rutile, with lead compounds is well known, and has been described in the patent and scientific literature. However, it has never been previously disclosed that such lead titanate formation could be effected when using a titanate as the starting material.

That ilmenite is subject to conversion to the titanate of strong alkali metals, as for example: $FeTiO_3 + 2NaOH \rightarrow Na_2TiO_3 + FeO + H_2O$, is also well known; but it has never been supposed that such a reaction could be made to take place with a compound of a metal of amphoteric nature such as lead.

However, we have now discovered that our new type of titanium pigment composition is vastly superior both to powdered ilmenite as such, and also to the calcined sulphuric acid treated product, not only in that it may be prepared in a range of more pleasing colors, but also in that paints so pigmented afford a much greater degree of protection when applied to surfaces, particularly to metallic surfaces, than paints pigmented with the older types of ilmenite pigments. Apparently our new type of pigment composition is reactive, chemically and/or physically, with vegetable drying oils, and when mixed therewith, imparts excellent rust-proof qualities and film durability.

Although we have found our novel pigment compositions to be especially adaptable for the manufacture of protective coatings when mixed with film-forming vehicles; nevertheless, because of their extremely high covering power, tinting strength, dispersibility, fineness and other valuable pigment properties they are equally adaptable to many other uses in which pigments are employed. For example; they are useful in pigmenting or loading rubber, plastics, paper, textiles, etc.

The paints so pigmented spread in a continuous film which adheres firmly to metallic surfaces.

We have also discovered that relatively small amounts of lead compounds, when mixed with powdered ilmenite and calcined, greatly improve the properties of the ilmenite as a paint pigment. However, if desired, quantities of lead compounds up to and in excess of the chemical equivalent of the titanium in the ilmenite may be used. By adjusting the quantity of lead compound used and varying the calcining conditions, pigment compositions possessing a variety of colors may be produced, each of which affords excellent protection when mixed with the usual types of paint vehicles and spread as a paint.

If a lead compound in excess of the chemical equivalent of the titanium present is used, the lead compound in excess will form a part of the final product or it may decompose to lead oxide which then forms part of the final product, depending upon the lead compound used and the calcining conditions.

If the lead compound is used in quantities chemically equivalent to the titanium present in the ilmenite, or in lesser amounts, an equivalent amount of iron in the ilmenite will be replaced by the lead. This replaced iron is then converted to ferric oxide under the oxidizing conditions of the calcination. If the lead compound is employed in quantities insufficient to replace completely all the iron in the ilmenite, the excess ferrous titanate (ilmenite) will be converted to ferric titanate and ferric oxide. The following equations exemplify the probable reactions that occur:

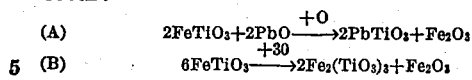

(A) $2FeTiO_3 + 2PbO \xrightarrow{+O} 2PbTiO_3 + Fe_2O_3$ (B) $6FeTiO_3 \xrightarrow{+30} 2Fe_2(TiO_3)_3 + Fe_2O_3$

Having now described our invention we give in detail several examples illustrating methods by which it may be put into operation. It is to be understood, however, that the invention is not limited to the examples. Various proportions, various calcining conditions, including temperatures and durations of calcining, may be used without departing from the scope of the invention.

*Example No. 1.*—One thousand pounds of powdered ilmenite of such particle size that substantially all will pass a 300 mesh screen is intimately mixed with 50 pounds of litharge, PbO. This mixture is charged into a furnace and calcined for about 4 hours at about 900° C., after which the product is disintegrated by milling. The color of the pigment composition produced is a red brown.

*Example No. 2.*—One thousand pounds of powdered ilmenite is intimately mixed with 25 pounds of litharge, PbO. This mixture is charged into a furnace and calcined for about 4 hours at about 900° C., after which the product is disintegrated by milling. This pigment composition is redder than that of the first example.

*Example No. 3.*—One thousand pounds of powdered ilmenite is intimately mixed with 100 pounds of litharge, PbO. The mixture is calcined for about 4 hours at about 900° C., and then disintegrated by milling. This pigment composition is the yellowest of the previous examples.

*Example No. 4.*—One thousand pounds of powdered ilmenite is intimately mixed with 58 pounds of basic carbonate white lead. The mixture is calcined for about 4 hours at about 900° C., and then disintegrated by milling.

*Example No. 5.*—One thousand pounds of powdered ilmenite is intimately mixed with 42 pounds of lead acetate, $Pb(C_2H_3O_2)_3.3H_2O$. The mixture is calcined for about 2 hours at about 600 C., followed by 4 hours at 900° C. The material is disintegrated by milling.

*Example No. 6.*—Powdered ilmenite and litharge are mixed in the ratio of 1 part ferrous titanate $(FeTiO_3)$ to 1.47 parts lead oxide (PbO), by weight. This mixture is continuously fed to a rotary kiln, the rate of addition being sufficient to retain the mixture in the calcining zone at about 900° C. for four hours. The color of the pigment composition so produced will be reddish brown, and may be rendered adaptable for pigment purposes by milling.

We have found that the desired chemical reactions may be effected at temperatures from below 600° C. to above 1000° C. However, in order to obtain desirable control of the color and other pigment properties, we prefer to operate within the range of 800° to 950° C.

We believe that our pigment compositions comprise substantially lead titanate, ferric oxide and ferric titanate. However, it will be understood that, as a result of possible side reactions, other compounds, for example, a complex lead-iron-titanate and lead ferrites or ferrates may be present in our novel pigment compositions.

Our improved pigment compositions when used in paints impart properties such as resistance to corrosion and adhesion to metals, that are not obtained by, and are superior to, those present in a mere physical mixture of separately prepared lead titanate, ferric oxide, and ferric titanate.

In the appended claims, the term "lead-containing material" is generically used to designate both lead compounds and metallic lead.

We claim as our invention:

1. The method of making a variably colored titanium pigment composition containing lead titanate and iron oxide, which comprises mixing powdered ilmenite with a lead-containing material, and then calcining said mixture under oxidizing conditions at temperatures between 500° C. and 1000° C. until same is substantially completely converted into said colored pigment composition composed essentially of a plurality of the following iron and lead compounds: iron titanate, iron oxide, lead titanate, lead oxide, in which substantially all the iron present is combined as ferric iron.

2. The method of making a variably colored titanium pigment composition containing lead titanate and iron oxide, which comprises mixing powdered ilmenite with lead oxide in amount less than that theoretically required to combine with all the titanium in said ilmenite, and then calcining said mixture under oxidizing conditions at temperatures between 500° C. and 1000° C. until same is substantially completely converted into said colored pigment composition composed essentially of iron titanate, lead titanate and iron oxide, in which substantially all the iron present is combined as ferric iron.

3. The method of making a variably colored titanium pigment composition containing lead titanate and iron oxide, which comprises mixing powdered ilmenite with lead oxide in an amount about that theoretically required to combine with all the titanium in said ilmenite, and then calcining said mixture under oxidizing conditions at temperatures between 500° C. and 1000° C. until same is substantially completely converted into said colored pigment composition composed essentially of lead titanate and iron oxide, in which substantially all the iron present is combined as ferric iron.

4. The method of making a variably colored titanium pigment composition containing lead titanate and iron oxide, which comprises mixing powdered ilmenite with lead oxide in an amount in excess of that theoretically required to combine with all the titanium in said ilmenite, and then calcining said mixture under oxidizing conditions at temperatures between 500° C. and 1000° C. until same is substantially completely converted into said colored pigment composition composed essentially of iron oxide, lead titanate and lead oxide, in which substantially all the iron present is combined as ferric iron.

5. In the method of making a variably colored titanium pigment composition containing lead titanate and iron oxide from a mixture of powdered ilmenite and lead-containing material, the step which consists in calcining said mixture under oxidizing conditions at temperatures between 500° C. and 1000° C. until same is substantially completely converted into said colored pigment composition composed essentially of a plurality of the following iron and lead compounds: iron titanate, iron oxide, lead titanate, lead oxide, in which substantially all the iron present is combined as ferric iron.

6. A colored titanium pigment composition comprising a calcine composed substantially of lead titanate and iron oxide in which substantially all the iron is combined as ferric iron.

7. A colored titanium pigment composition comprising a calcine composed substantially of lead titanate and iron oxide and lead oxide, in which substantially all the iron present is combined as ferric iron.

8. A colored titanium pigment composition comprising a calcine composed substantially of iron titanate, lead titanate and iron oxide, in which substantially all the iron present is combined as ferric iron.

9. A colored titanium pigment composition comprising a calcine containing relatively large amounts of iron titanate, lesser amounts of lead titanate and iron oxide, in which substantially all the iron present is combined as ferric iron, said pigment composition with the addition of vegetable drying oils yielding a colored product adapted for painting that will set and dry in a rust-inhibiting, corrosion-resisting film firmly adherent to metallic surfaces.

LONNIE W. RYAN.
WINFRED J. CAUWENBERG.